United States Patent [19]

Gerschner et al.

[11] Patent Number: 4,982,143
[45] Date of Patent: Jan. 1, 1991

[54] PHASE CONTROL CIRCUIT FOR PROTECTION OF A MOTOR AGAINST THERMAL OVERLOAD

[75] Inventors: Martin Gerschner, Leinfelden-Echterdingen; Friedrich Hornung, Stuttgart, both of Fed. Rep. of Germany

[73] Assignee: Robert Bosch GmbH, Stuttgart, Fed. Rep. of Germany

[21] Appl. No.: 306,483

[22] Filed: Feb. 3, 1989

[30] Foreign Application Priority Data

Feb. 15, 1988 [DE] Fed. Rep. of Germany ....... 3804679

[51] Int. Cl.⁵ .................... H02H 7/08; G05D 23/20
[52] U.S. Cl. .................................. 318/471; 318/434; 318/473; 361/24; 361/25
[58] Field of Search ............... 318/471, 472, 473, 434, 318/599, 806, 812; 361/23, 24, 25, 27, 103; 330/143, 207 P, 256, 266, 272, 289, 298; 323/245, 246

[56] References Cited

U.S. PATENT DOCUMENTS

| | | | |
|---|---|---|---|
| 3,293,539 | 12/1966 | Chambers | 323/245 X |
| 3,421,027 | 1/1969 | Maynard et al. | 323/245 X |
| 3,535,615 | 10/1970 | Howell et al. | 323/245 X |
| 3,543,119 | 11/1970 | Bauer et al. | 318/471 X |
| 3,551,774 | 12/1970 | Rusch | 361/27 X |
| 3,569,781 | 3/1971 | Strachan | 318/473 X |
| 3,683,250 | 8/1972 | Fricker | 323/245 X |
| 3,693,047 | 9/1972 | Hamstra | 318/472 X |
| 3,708,720 | 1/1973 | Whitney et al. | 361/27 |
| 3,868,554 | 2/1975 | Konrad | 318/434 |
| 4,097,790 | 6/1978 | Wilson | 318/472 X |
| 4,157,513 | 6/1979 | Ghiringhelli et al. | 330/143 X |

FOREIGN PATENT DOCUMENTS

| | | | |
|---|---|---|---|
| 3239847 | 5/1983 | Fed. Rep. of Germany | 318/473 |
| 0235142 | 4/1986 | Fed. Rep. of Germany | 361/27 |
| 55-164791 | 12/1980 | Japan | 318/473 |

OTHER PUBLICATIONS

Motor Speed Applications Using the TDA 2085A, Motorola/Plessey, 1982.

*Primary Examiner*—Bentsu Ro
*Attorney, Agent, or Firm*—Frishauf, Holtz, Goodman & Woodward

[57] ABSTRACT

Thermal overload of a motor is avoided by measuring temperature and, when a limit temperature is exceeded, reducing the phase "window" within each power cycle during which the motor is energized. The limit temperature is sensed by a temperature sensor which is warmed either by heat conduction through a cooling body or by an air stream from the motor. The overload protection apparatus requires no measuring resistance in the load circuit.

3 Claims, 1 Drawing Sheet

PHASE CONTROL CIRCUIT FOR PROTECTION OF A MOTOR AGAINST THERMAL OVERLOAD

Cross-reference to related U.S. patents to one or both of the present co-inventors, assigned to the assignee of the present application, Robert Bosch GmbH, the disclosures of which are incorporated by reference: U.S. Pat. Nos. 3,848,168; 3,875,485; 4,213,077; 4,463,293; 4,502,549; 4,540,318, 4,722,021.

Cross-reference to related documents:
German Patent Disclosure Document DE-OS No. 34 22 485, SCHLEGEL, assigned to BSG Schalttechnik GmbH & Co. KG, publ. 19 Dec. '85, Method & Apparatus for Current Limitation of Electric Motors;
Phase Control Circuits and Zero Voltage Switches, Telefunken Databook 1984;
Motor Speed Applications Using the TDA 2085A, Motorola/Plessey, 1982.

The present invention relates generally to overload protection of electric motors and, more particularly, to a novel overload protection circuit in which a phase control is responsive to temperature sensed adjacent to the motor.

BACKGROUND

Prior art devices for temperature regulation of a motor are known, which perform overload protection or current-limiting functions. Such devices have a measuring resistance through which the motor or load current passes, and whose voltage drop is detected by an evaluation circuit. When a predetermined limit value is exceeded, the current supplied to the motor is reduced or interrupted. Such circuits are described in application notes from semiconductor manufacturers, e.g. the Telefunken Databook 1984 "Phasenanschnittsteuerschaltungen und Nullspannungsschalter" (Phase Control Circuits and Zero Voltage Switches) or the Motorola/Plessey 1982 booklet, "Motor Speed Applications Using the TDA 2085A".

These prior art overload protection circuits have the disadvantage that, although the motor current does indeed provide information about the load state of the motor, it does not provide information about its temperature state. However, in the final analysis, only detection of heating of the motor provides adequate overload protection.

DE-OS No. 34 22 485 discloses a device in which the heating of the motor is estimated using a measuring resistance which is heated by the load current of the motor. The placement of the measuring resistance in the motor cooling air stream means that it measures not only the current-dependent heating, but is also influenced by the starting temperature of the cooling air. It is disadvantageous that, for translation of current values into heat values, a special structural form for the measuring resistance is necessary. It is further disadvantageous that the static quantities which determine the thermal time constants of the motor, namely heat resistance and heat volume or capacity, can be only very poorly simulated and varied in a measuring resistance.

THE INVENTION

Accordingly, it is an object to provide overload protection without such a measuring resistance and its attendant disadvantages.

Briefly, the protection apparatus of the present invention features a temperature sensor, adjacent the motor, which couples to and controls a phase controller which regulates motor power. The elimination of the measuring resistance increases the maximum usable power of the regulated motor. Further, the elimination of the resistance and the simple arrangement of the temperature sensor in relation to the semiconductor switch offers significant cost savings.

Further advantages and features of the invention will be described below. It is particularly advantageous to arrange the temperature sensor on a cooling plate or heat sink in a flow of fluid cooling medium such as the air stream of the motor, which greatly simplifies matching to the heat characteristics of the motor. This arrangement is well adapted for integration into the cooling duct of an electric power tool, since it has a small structure. The use of a temperature sensor with a Positive-Temperature-Coefficient (PTC) or Negative-Temperature-Coefficient (NTC) characteristic is desirable since such sensors are particularly robust and operate reliably. The common mounting of the temperature sensor and the semiconductor switch on the same cooling plate or body is desirable since it assures good heat coupling.

In a further embodiment of the invention, it is desirable to give the cooling body a smooth or partially fluted surface, which determines the thermal resistance of the arrangement, which simplifies matching to the motor. It is particularly advantageous to be able to subsequently change the heat characteristics of the motor in a simple manner, namely by changing the mounting relationship between the temperature sensor and the semiconductor switch, for example by lengthening a slit between them on the cooling plate.

The special configuration of the cooling body, through choice of materials, of wall thickness b, of length l and height h, and of a narrowed portion between the temperature sensor and the semiconductor switch, make possible a particularly advantageous and simple simulation of the heat capacity, of the heat resistance, and of the controlling time constants of the arrangement It is desirable, for improved heat coupling, to fasten the temperature sensor in an opening or space defined by a pocket in, or bent-back flange of, the cooling body.

DRAWINGS

Two embodiments of the invention are illustrated in the drawings and detailed in the description below.

Figure 1:
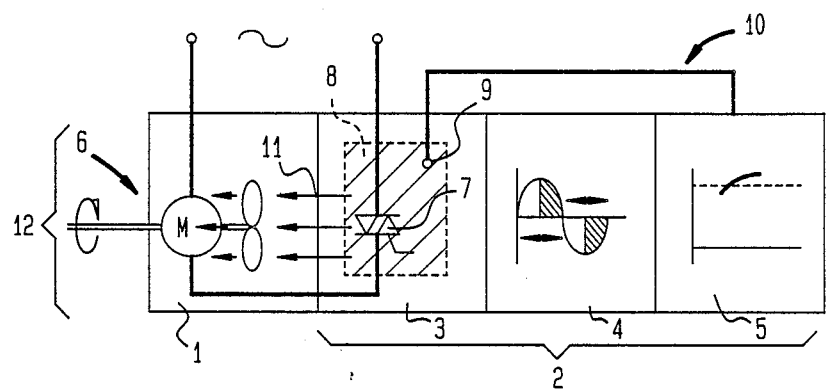
FIG. 1 illustrates schematically a first embodiment.

DETAILED DESCRIPTION FIG. 1 illustrates the first embodiment. Motor 1 and electronic component 2 form a functional unit in the form of a regulated circuit 6. The electronic component 2 comprises an adjustment element 3 with a semiconductor switch 7, a cooling body or heat sink plate 8, and a temperature sensor 9 mounted on the cooling body. The semiconductor switch 7 can be, alternatively, a Triac, thyristor or transistor. Upstream of the adjustment element 3 is a controller 4 which sets the current passage angle or the duty cycle of semiconductor switch 3.

Controller 4 can be any of several commercially available components, such as the Telefunken integrated circuit U210B. Upstream of controller 4, in turn, is an evaluation circuit 5. This also can be a commercially available component, such as a Schmitt trigger or threshold amplifier. The input terminals of evaluation circuit 5 are connected with temperature sensor 9, which may, for example, be mounted on cooling body 8 near semiconductor switch 7. The cooling body with the components of the regulated circuit 8 is secured in such a way that it is in the air stream of motor 1.

A suitable motor is a univeral motor intended for 220 VAC operation, with a power rating of 1500 Watts, an armature with 12 lamellae, and a collector or commutator with 24 lamellae.

MODE OF OPERATION

Upon start-up of motor 1, semiconductor switch 7 and cooling body 8 are subjected to the same air stream. Assuming that the heat characteristics and heating time constants of cooling body 8 have been properly matched to those of motor 1, the cooling body temperature will mirror the motor temperature. If the temperature at the motor, and hence also at the cooling body, exceeds a predetermined limit, temperature sensor 9's signal will cause evaluation circuit 5 to actuate controller 4 to cut back the phase "window" or angle during which semiconductor switch 7 conducts, so that the motor temperature is at least prevented from rising further.

SECOND EMBODIMENT

Figure 2:
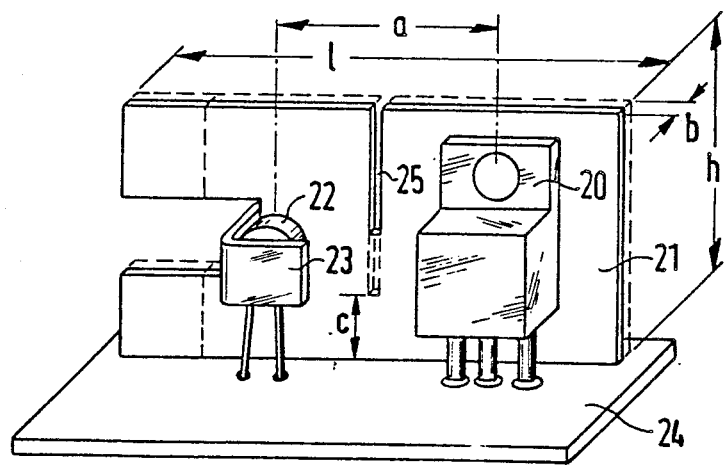
FIG. 2 illustrates a second embodiment of the invention.

As FIG. 2 illustrates, the second embodiment has a cooling body 21, on which semiconductor switch 20 and temperature sensor 22 are mounted. For improved heat transfer, temperature sensor 22 can be mounted, as shown, in a pocket defined by an L-shaped bent-back flange 23 of cooling body 21. The electrical connection of temperature sensor 22 and semiconductor switch 20 in the regulated circuit is effected by means of a printed circuit board 24. Between the semiconductor switch 20 and the temperature sensor 22, a narrowed or necked-down portion of cooling body 21 is formed by milling a transverse slit or notch 25. The depth of this slit defines a quantity c, which is the remaining unmilled width of cooling body 21, i.e. the part which continues to transfer heat to sensor 22. The distance between semiconductor switch 20 and temperature sensor 22 defines a quantity a, and the material thickness of the cooling body defines a quantity b.

EXAMPLE

Cooling body height h=22 mm;
Cooling body length l=60 mm;
Component spacing a=15 mm;
Heat sink thickness b=2 mm;
Unmilled area width c=7 mm.

Variation of the dimensions a, b, or c permits simple simulation of the temperature characteristics of any motor. The quantity b represents a measure of the heat capacity of the system, while quantities a and c essentially represent the heat resistance of the arrangement. Since this second embodiment, like the first, is arranged in the air stream of the motor, appropriate positioning of this arrangement permits simple matching to the heat characteristics of the motor. Thus, the circuit arrangement can be placed in the inlet duct of the motor, in the outlet duct, or directly on the motor stand or bracket.

Various modifications are possible within the scope of the inventive concept, and features of any of the above-described embodiments can be used with any other embodiment.

We claim:

1. Phase-control apparatus for protection of an electric motor (M), cooled by a flow of fluid cooling medium, against thermal overload, having
    a cooling body (8, 21) with thickness (b), height (h), and length (l) dimensions selected to simulate thermal time constants of said motor;
    a temperature sensor (9, 22) mounted on said cooling body;
    a semiconductor switch (7, 20) mounted on said cooling body and connected in circuit with said motor (M); and
    a phase controller (4, 5);
    wherein
    said cooling body (8, 21) is located in said flow of fluid cooling medium (11),
    said temperature sensor (9, 22) has an electrical resistance which varies as a function of temperature, and is operatively coupled to heat flow at said semiconductor switch (7, 20) and
    said phase controller (4, 5) has an input connected to an output of said temperature sensor (9, 22) and has an output coupled to said switch (7, 20), and narrows the current passage phase angle as temperature at said sensor (9, 22) increases.

2. Phase-control apparatus for protection of an electric motor (M) against thermal overload, having
    a temperature sensor (9, 22);
    a semiconductor switch (7, 20) connected in circuit with said motor (M); and
    a phase controller (4, 5); wherein:
    said temperature sensor (9, 22) is operatively coupled to heat flow at said semiconductor switch (7, 20), and
    said phase controller has an input connected to an output of said temperature sensor and has an output coupled to said switch (7, 20), and narrows the current passage phase angle as temperature at said sensor increases,
    said temperature sensor (9, 22) and said semiconductor switch (7, 20) are both mounted on a common cooling body (8, 21), and
    said cooling body has a narrowed or necked-down portion (25) between said temperature sensor (9, 22) and said semiconductor switch (7, 20).

3. Phase-control apparatus for protection of an electric motor (M) against thermal overload, having
    a temperature sensor (9, 22);
    a semiconductor switch (7, 20) connected in circuit with said motor (M); and
    a phase controller (4, 5); wherein:
    said temperature sensor (9, 22) is operatively coupled to heat flow at said semiconductor switch (7, 20) and said phase controller has an input connected to an output of said temperature sensor and has an output coupled to said switch (7, 20), and narrows the current passage phase angle as temperature at said sensor increases,
    said temperature sensor (9, 22) and said semiconductor switch (7, 20) are both mounted on a common cooling body (8, 21), and
    said temperature sensor (9, 22) is mounted on said cooling body (8, 21) in a pocket defined by an encircling portion (23 of said cooling body.

* * * * *